UNITED STATES PATENT OFFICE.

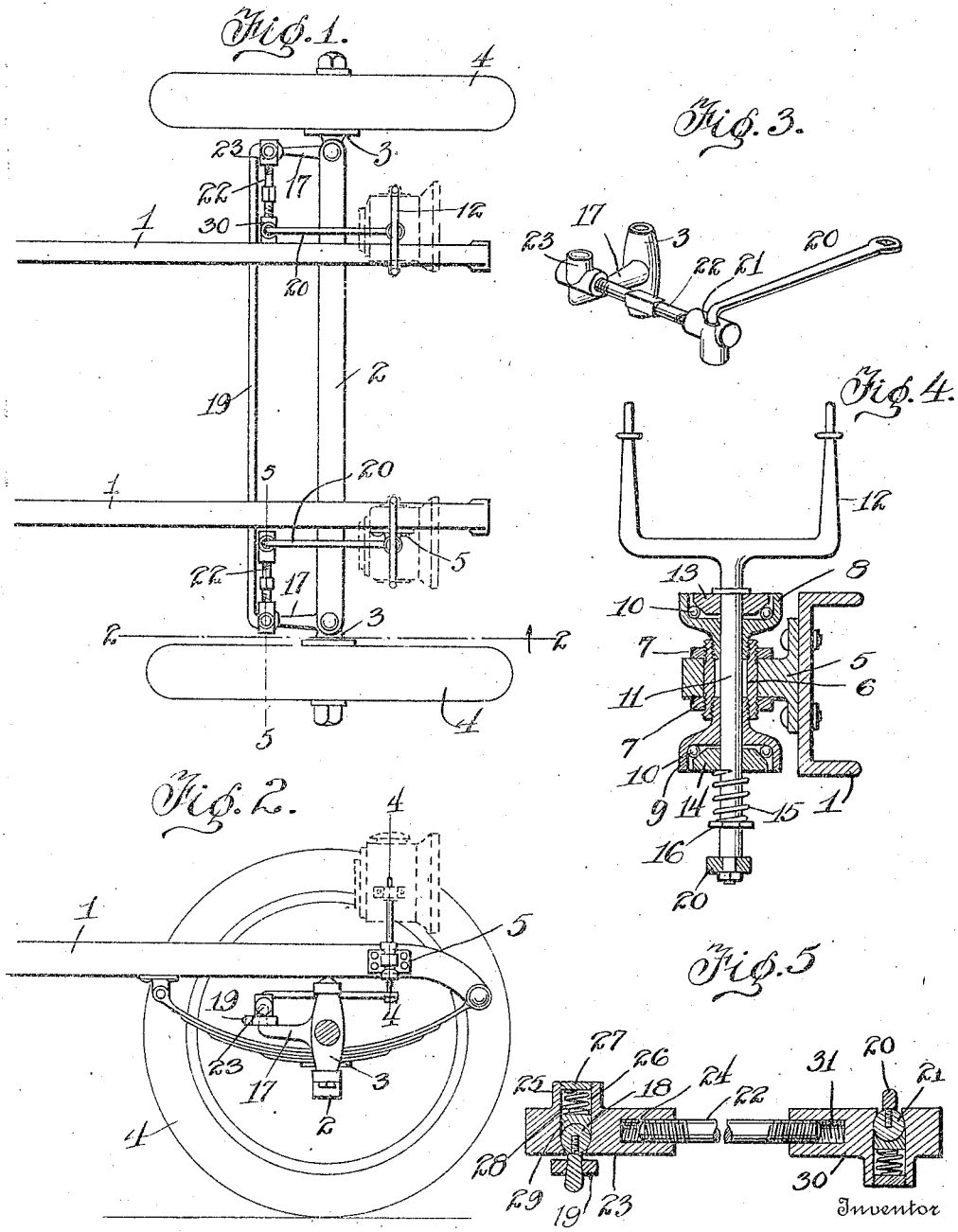

ERNEST GRAY, OF LOGAN, UTAH, ASSIGNOR OF ONE-HALF TO WILLIAM KIDMAN, OF LOGAN, UTAH.

DIRIGIBLE HEAD-LAMP FOR VEHICLES.

1,121,824.  Specification of Letters Patent.  Patented Dec. 22, 1914.

Application filed April 1, 1914. Serial No. 828,844.

*To all whom it may concern:*

Be it known that I, ERNEST GRAY, a citizen of the United States, residing at Logan, in the county of Cache and State of Utah, have invented certain new and useful Improvements in Dirigible Head-Lamps for Vehicles, of which the following is a specification, reference being had to the accompanying drawings.

This invention relates to head lamps for vehicles, and more particularly to that class of head lamps which are dirigible and are connected to the steering mechanism of the vehicle so that upon turning of the steering wheels thereof, the lamps will be turned so that the driver of the vehicle is afforded a view of the road immediately in front of the vehicle when the same is making a turn or when it is traveling in a straight line.

An object of this invention is the provision of controlling means for head lamps of vehicles, in which the vertical movement of the body of the vehicle when the same is passing over a rough roadway, is compensated for.

A further object of this invention is the provision of controlling means for the head lamps of vehicles, in which each of the lamps may be individually adjusted with relation to its adjacent steering wheel.

With these and other objects in view, my invention consists in the novel construction, combination, and arrangement of parts to be hereinafter more fully described, claimed, and illustrated in the accompanying drawings, in which, Figure 1 is a top plan view of my device, showing the same connected to the frame of a vehicle; Fig. 2 is a sectional view on the line 2—2 of Fig. 1; Fig. 3 is a detail perspective view showing the manner of connecting one of the steering arms to one of the lamp posts; Fig. 4 is a section on the line 4—4 of Fig. 2; and Fig. 5 is a section on the line 5—5 of Fig. 1.

Referring more particularly to the drawings, the numeral 1 designates the forward ends of the bed rails of the chassis of a vehicle, 2 the front axle thereof, and 3 the knuckles which are connected to the opposite ends of the axle and which support the steering wheels 4 of the vehicle. Connected to each bed rail adjacent its forward end, is the bracket 5 in which a sleeve 6 is mounted, each of the sleeves being threaded interiorly and exteriorly at its opposite ends. The sleeves project above and below the brackets 5, and nuts 7 are threaded on the opposite ends of the sleeves to engage the upper and lower faces of the brackets to maintain the sleeves in proper position therein. Threadably connected to the interior threads of each sleeve at its upper and lower ends are bearing ball cups 8 and 9, respectively, in which a series of bearing balls 10 is mounted and rotatably disposed in each sleeve is the post 11 of a lamp bracket 12, each post carrying a cone 13 adjacent its upper end, for engagement with the bearing balls 10 in the upper bearing ball cups 8. The lower ends of the posts 11 project below the sleeves, and slidably disposed on the projecting end of each post is a cone 14 which is adapted to engage against the balls 10 disposed in the lower cup 9. To maintain the cones 14 in engagement with the balls 10 in the lower cups, a coil spring 15 is disposed around each post, the upper end of the spring engaging the cone 14, the lower end of the spring bearing against a pin 16 which is disposed through the projecting lower end of the post.

Connected to each of the knuckles 3 is a rearwardly extending steering arm 17, which is offset upwardly at its rear end and is formed at the extremity of the upwardly extending portion with a ball 18. A rod 19 is connected at its opposite ends to the upwardly extending portion of each arm 17, so that upon operation of the steering mechanism of the automobile, the steering wheels 4 are turned simultaneously in the same direction. Detachably connected to the lower extremity of each of the posts 11, is a laterally extending arm 20, the free end of which is offset downwardly, and provided at its extremity with a ball head 21. To connect the steering arm 17 of each wheel with the arm 20 of the adjacent lamp post, a suitable connecting rod 22 is provided which is oppositely threaded at its opposite ends. Mounted on the outer threaded end of each arm 22 is a joint member 23, each of the joint members having a threaded recess 24 in one end for the reception of the outer threaded end of the rod 22 and each of the joint members 23 is provided with an upwardly projecting annular extension 25, through which and through the body of the member 23 is formed a vertical annular opening 26. The lower end of each opening 26 is adapted to receive a ball 18 upon the steering arm 17, and the upper end of the opening 26 in each of the members 23 is adapted to receive a nut 27 which closes the opening, and bearing against the under face of each nut 26 is a spring 28, the lower end of which engages a wearing plate 29 which bears against the ball 18. A similar joint member 30 is connected to the inner end of each arm 22, the joint members 30 being in a position reverse to that of the members 23, so that the balls 21 of the arms 20 are disposed in the upper ends of the openings in the members. The recesses 31 in the brace members 30 which receive the inner ends of the rods 22, are oppositely threaded from the recesses in the members 23, so that when the oppositely threaded ends of the rods 22 are disposed in the recesses in the joint members by turning the rods 22, the position of the lamps supported upon the brackets 12 may be adjusted with relation to the steering wheels.

In the practical use of my device, when the various parts are connected in the manner heretofore described, it will be seen that when the steering mechanism of the vehicle is operated to turn the wheels, that the head lamps will also be turned by reason of the connection of the posts 11 with the steering arms 17 of the vehicle.

It will be readily seen that the vertical movement of the body of the vehicle is compensated for by reason of the springs 22 which are disposed in the path of the balls 18 and 21 carried by the steering arms 17 and the arms 20, respectively, and it will also be readily seen that each of the lamps may be adjusted individually with relation to its adjacent steering wheel, upon rotation of the proper connecting rod 22.

Having thus fully described my invention, what I desire to secure and claim by Letters Patent, is:—

1. In combination with the steering arm of a motor vehicle, of a lamp supporting post rotatably connected to the frame of the vehicle, a laterally extending operating arm connected at one end to the lower end of the post, the free end of said operating arm being extended downwardly and provided with a head at its extremity, the free end of said steering arm being extended upwardly and provided with a head at its extremity, a connecting rod having enlarged ends, the enlarged ends of the connecting rod having vertically extending circular openings formed therein, the opening in one of the enlarged ends being adapted to receive the head on the downturned end of the operating arm, the opening in the other enlarged end of the connecting rod being adapted to receive the head on the upturned end of the steering arm, and a spring pressed cap mounted in each of the openings for engagement against the head therein.

2. The combination with a vehicle frame, of a pair of brackets connected to the bed rails of the frame adjacent their forward ends, a vertically disposed sleeve mounted in each of the brackets, said sleeves being interiorly threaded at their opposite ends, bearing ball cups threadably connected in the opposite ends of each of the sleeves, a lamp supporting post disposed through each of the sleeves and the bearing ball cups carried thereby, cones carried by said post for engagement with the balls in said cups, a laterally extending arm connected at one end to the lower end of each of the posts, and means for adjustably connecting each of said arms to one of the steering arms of the vehicle, as and for the purpose described.

In testimony whereof I hereunto affix my signature in the presence of two witnesses.

ERNEST GRAY.

Witnesses:
ARTHUR BATESON,
WILLIAM KIDMAN, Jr.